United States Patent [19]

Soubliere et al.

[11] Patent Number: 5,061,023
[45] Date of Patent: Oct. 29, 1991

[54] TELEPHONE TERMINAL BASES

[75] Inventors: Marc P. Soubliere; Edward J. Foster, both of London, Canada

[73] Assignee: Northern Telecom Limited, Montreal, Canada

[21] Appl. No.: 549,035

[22] Filed: Jul. 6, 1990

[51] Int. Cl.⁵ .............................. A47B 88/00
[52] U.S. Cl. ...................... 312/328; 16/355; 312/223
[58] Field of Search ............ 312/328, 329, 248; 16/355; 49/395

[56] References Cited

U.S. PATENT DOCUMENTS

| 819,098 | 5/1906 | Underhill | 16/355 |
|---|---|---|---|
| 2,775,781 | 1/1957 | Morgan | 312/328 X |
| 4,435,921 | 3/1984 | Marin | 49/395 |
| 4,554,700 | 11/1985 | Lyman | 16/355 X |
| 4,903,866 | 2/1990 | Loew | 312/248 X |

Primary Examiner—Joseph Falk
Attorney, Agent, or Firm—R. J. Austin

[57] ABSTRACT

A telephone terminal base for vertical mounting and with a front closure that is movable about a horizontal hinge axis to open and close the base. The hinge structure is formed by cooperable hinge parts on front and rear closures, the hinge parts slidable one upon the other along an arc of a circle centered upon the hinge axis. The hinge axis is positioned forwardly of the base and with the hinge parts spaced from the hinge axis, they are disposed entirely within the base. The front closure is preferably hinged to move downwardly from a vertical closed position.

11 Claims, 5 Drawing Sheets

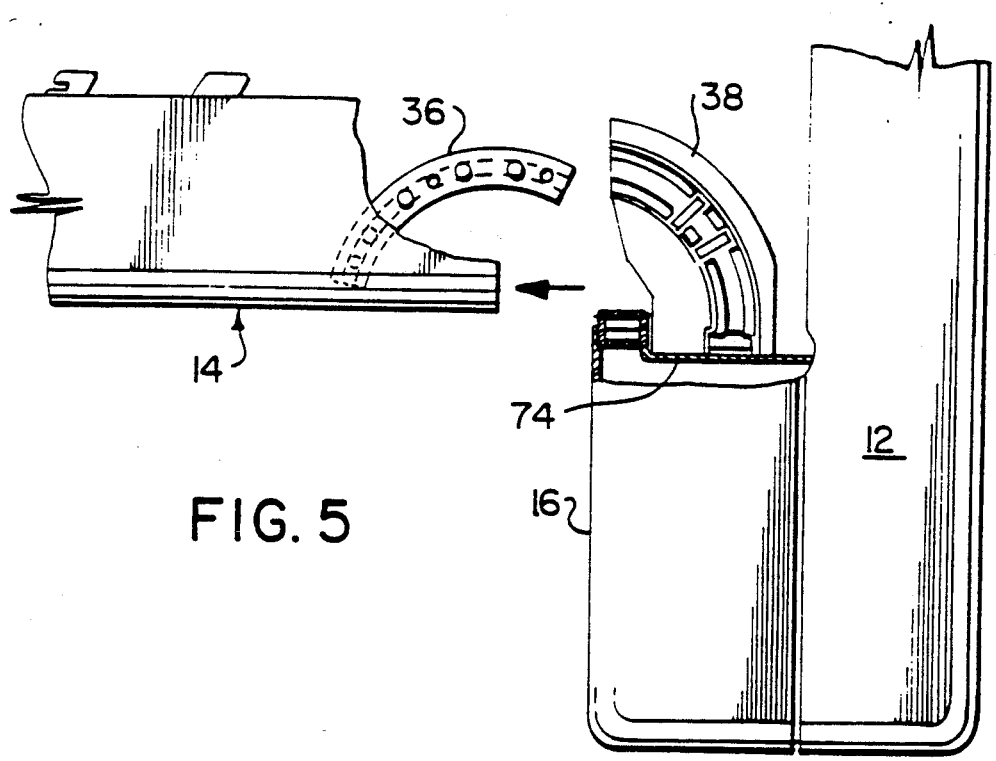
FIG. 5
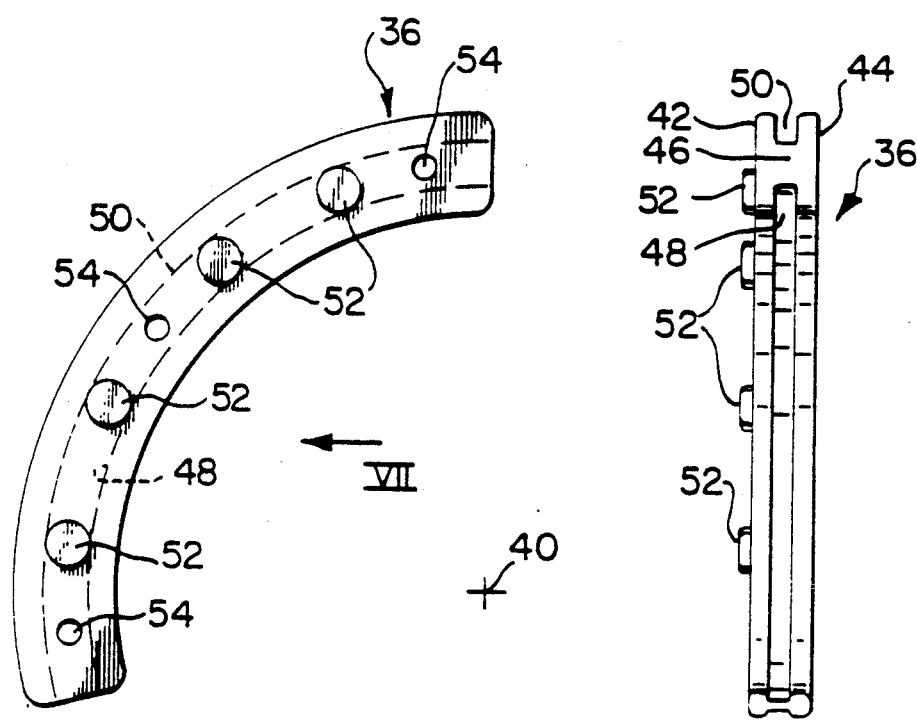
FIG. 6
FIG. 7

TELEPHONE TERMINAL BASES

This invention relates to telephone terminal bases.

Telephone terminals have terminal bases some of which are designed for mounting upon walls. Telephones of this type of construction are used as public payphones and the terminal bases in these bases form closures each of which has a rear closure member for mounting upon a wall and a front closure member which is detachably securable to the rear closure member with the front closure member mounted upon the rear closure member in a closed condition, the enclosure formed by the terminal base houses electronic equipment for the operation of the phone and also receives coin storage and coin operation and return equipment. All of the terminal bases of public telephone terminals are designed to enable the front closure member to be moved forwardly and outwardly from the rear closure member for maintenance and repair purposes. All of the methods which allow for the opening and closing of the front closure member must involve a mounting and release structure which is also protected by the terminal base when in the closed condition if acts of vandalism are to be deterred. For example, it is well known that if any hinge is exposed in the closed position of the terminal base then it is extremely likely that the hinge location will provide a focus for vandal operations. As a result, all modern public telephone bases are constructed in such a way, that any mechanism which allows for removal and replacement of the front cover is completely protected in the closed condition of the base.

The present invention seeks to provide a telephone terminal base for mounting upon a vertical surface and which enables the front closure member to be moved from a closed position in a completely new manner while, in the closed condition of the base, still maintaining complete protection for elements of the base which allow for the movement of the front closure member. Accordingly, the present invention provides a telephone terminal base having a rear closure member for mounting upon a vertical support, and a front closure member which is mounted upon the rear closure member about a horizontal hinge axis disposed forwardly of the front closure member by a hinge structure means which comprises hinge parts secured to front and rear closure members, the hinge parts coacting so as to slidably move one upon the other along an arc of a circle centered on the horizontal hinge axis to angularly move the front closure member between a closed position upon the rear closure member and an open position upon the rear closure member towards which the front closure member is hingedly moved forwardly from the rear closure member, the hinge parts spaced from the horizontal hinge axis to lie entirely within the base with the front closure member in the closed position.

With the above structure according to the invention and the horizontal hinge axis disposed forwardly of the front closure member, the front closure member during opening and in moving around the hinge axis, immediately moves away from the rear closure member thereby ensuring freedom of movement. The hinge parts, which are relatively movable around arcs of the circle, are easily accommodated upon the closure members so as to be entirely within the closure in the closed condition while still enabling movement of the front closure member about the forward hinge position. Hence, the hinge parts are not accessible for acts of vandalism.

While the front closure member may be hinged forwardly from an upper hinge position so that it would move upwards away from its closed position, it is preferable that it is hingedly moved forward from a lower hinge position so that it moves downwardly away from the closed position. In this preferred arrangement, the rear surface of the front closure member in the closed position and which may carry operating equipment, becomes the top surface of the closure member in the open position for ease of access to this equipment by a maintenance or repair engineer.

The hinge structure means may comprise only two hinge parts which coact together between the front and rear closure members. However, for stability and strength reasons, the hinge structure means preferably comprises two pairs of hinge parts, the two pairs being disposed in spaced positions in a direction parallel to the hinge axis with each pair comprising a hinge part upon the rear closure member and a coacting hinge part upon the front closure member. The hinge part upon the front closure member is preferably secured to a side wall of the front closure member as this provides strength and rigidity. While different materials may be used for the hinge parts, including metal, each hinge part is preferably an integrally molded structure which advantageously may be formed from a glass-filled resin material.

In one construction of each pair of hinge parts, the hinge part secured to the front closure member extends around the arc of a circle centered upon the horizontal axis and has a radially inner and a radially outer planar guide channel. The other hinge part of the pair has a radially inner and a radially outer guide rib locatable each within a corresponding guide channel with the hinge parts relatively slidably movable by relative movement of the ribs and channels during moving the front closure member into and out of the closed position. With this arrangement, the guide ribs may be completely removed from the guide channels to allow for complete removal or disassembly of the front closure member from the rear closure member whereby maintenance or repair functions may be carried out at a different location. The hinge parts secured to the front closure member may have two spaced parallel planar side elements extending around arcs of circles centered upon the horizontal hinge axis, the side elements defining between them the radially inner and outer guide channels which are spaced by a further element extending between the side elements. More specifically, this hinge part may be generally of H-shape.

One embodiment of the invention will now be described, by way of example, with reference to the accompanying drawings, in which:

FIG. 5 is a view similar to FIG. 4 and showing a front closure member of the base being removed from the rear closure member;

FIG. 6 is a side elevational view to a much larger scale of one part of a hinge structure means of the terminal base;

FIG. 7 is a view of the hinge part of FIG. 6 in the direction of arrow VII in FIG. 6;

Figure 1:
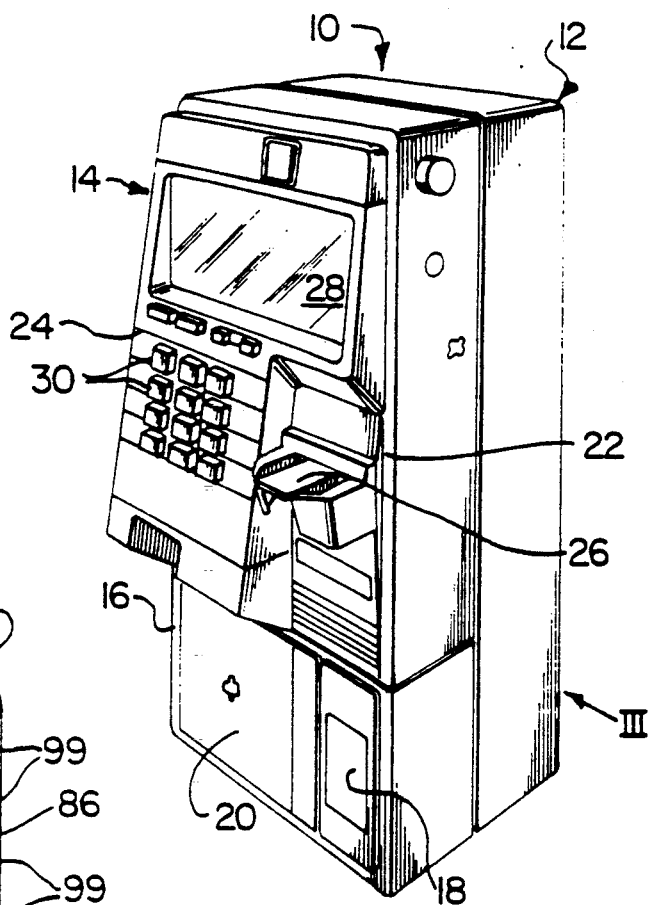
FIG. 1 is a front isometric view of a public telephone terminal base in a closed condition.

In the embodiment, as shown in FIG. 1, a public telephone terminal base 10 has a rear closure member or wall mount 12 and a front closure member or upper front cover 14 which, in a closed condition upon the wall mount, provides an enclosed chamber within which electronic operational equipment is housed. Below the upper front cover is a lower front cover 16 which is vertically shorter than the upper front cover 14 and behind the lower front cover, i.e. within the chamber, is housed a coin storage and coin return for the terminal. The lower cover has a conventional coin return opening 18 and a door 20 which is key operated to enable access to the coin storage. The upper front cover 14 has a cover base wall 22 and further includes a die cast metal embellishment 24 which extends outwardly from the base wall. The base wall includes a mount 26 for receiving a handset (not shown) of the telephone. The metal embellishment 24 comprises an upper rectangular aperture 28 through which, in use, a telephone user may obtain information from a printed information card (not shown) inserted into the aperture. The metal embellishment 24 also slidably receives a set of dialing buttons 30 which protrude from the front of the embellishment for operation by the user.

Figure 2:
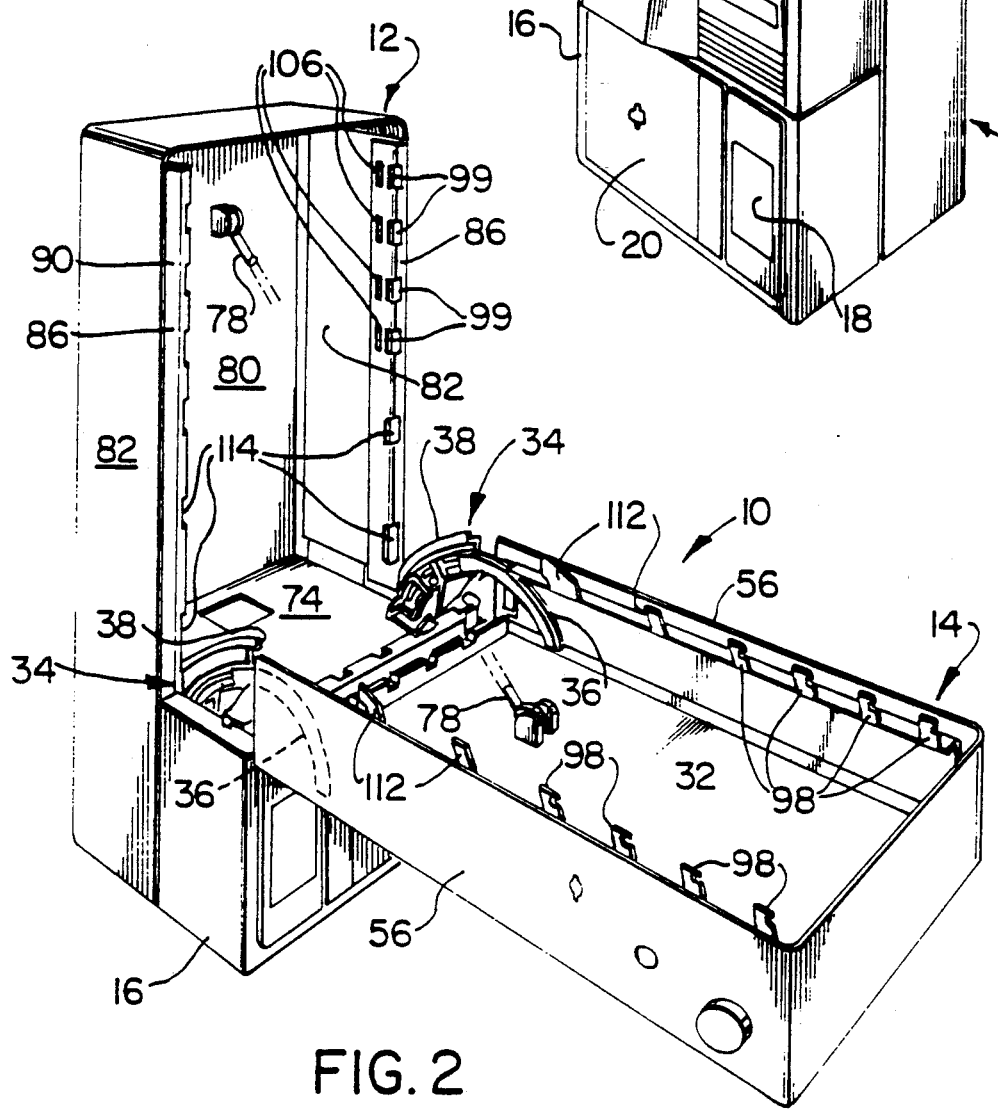
FIG. 2 is a front isometric view of the base from the other side of the base and shown in an open position.

To provide for access to the operational equipment for maintenance or repair purposes, the design of the terminal base is such that the upper front cover 14 is hingedly connected to the wall mount 12 about a lower horizontal hinge position of the upper front cover such that the upper front cover may be moved between the closed position shown in FIG. 1 and an outwardly and downwardly hinged open position such as shown in FIG. 2. While it is understood that the electronic operational equipment is housed between the rear wall mount 12 and the upper front cover 14 no such equipment is shown in FIG. 2, for reasons of clarity with regard to the inventive features to be described. It should be noted however that the upper front cover 14 carries some of the electronic equipment, mainly that which is operated directly by the push buttons 30. This equipment is carried on the rear face 32 of the upper front cover 14 when in the closed position, this rear face 32 being the upper surface of the upper front cover when this is in the open position shown in FIG. 2. Hence, for maintenance or repair purposes, the surface 32 forms a support surface for the equipment during maintenance and repair operations so that the equipment is easily accessible for maintenance personnel.

Figure 8:
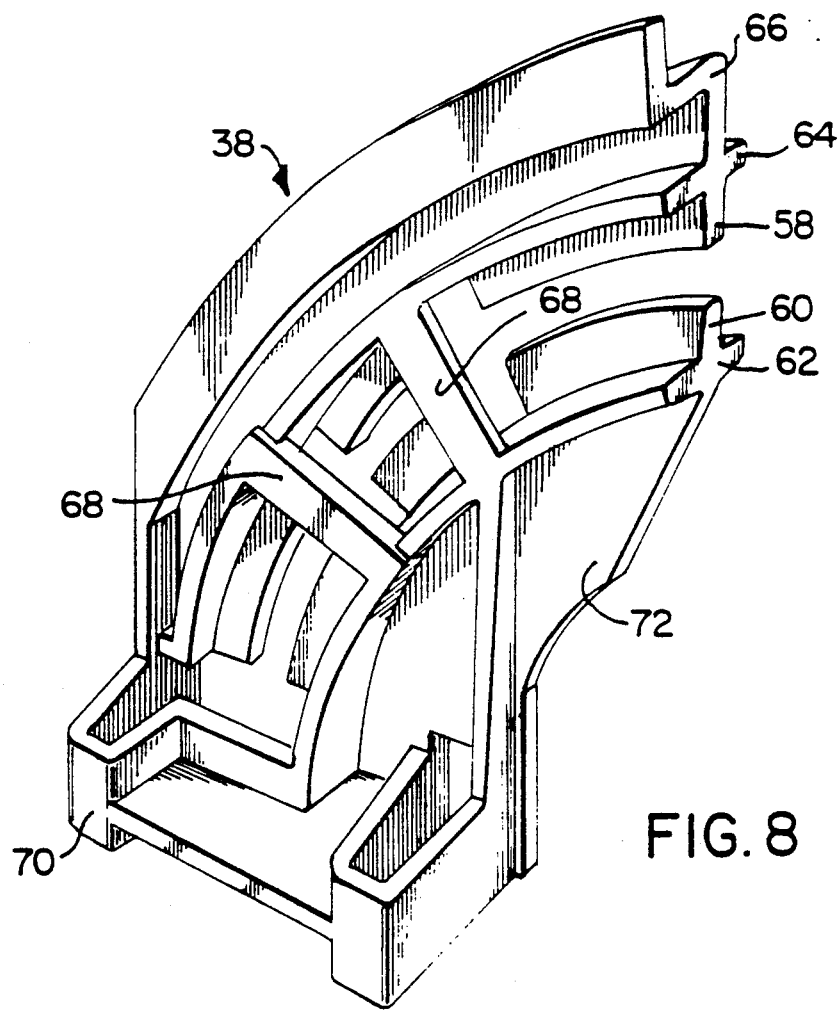
FIG. 8 is an isometric view of another hinge part of the hinge structure means which coacts with the hinge part of FIG. 6.

The upper front cover 14 is hingedly attached to the rear wall mount 12 by a hinge structure means which comprises two pairs 34 of hinged parts, with the pairs disposed in spaced positions in a direction parallel to the horizontal hinge axis as shown in FIG. 2. One pair 34 of hinge parts comprises one hinge part 36, as shown in FIGS. 6 and 7, and another hinge part 38 as shown in FIG. 8. Each hinge part 36 and 38 is an integrally molded structure formed from a glass-filled resin material having substantial rigidity and strength requirements for the purpose for which it is designed.

Figure 9:
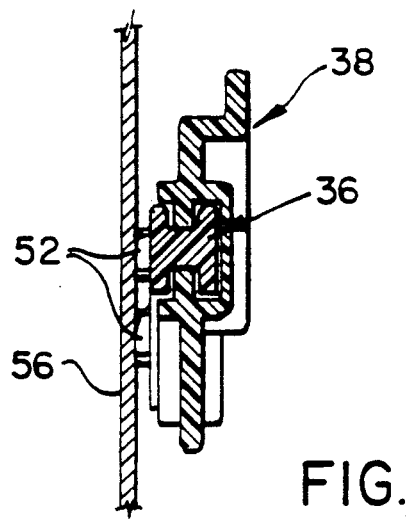
FIG. 9 is a cross-sectional view taken along line IX—IX in FIG. 3 and showing the hinge structure means in assembled condition and part of the front closure member.

As shown in FIG. 6, the hinge part 36 of each pair 34 is molded in arcuate shape in side view and extends around the arc of a circle having a center of radius 40 as shown in FIG. 6. At any cross-section, the part 36 is of substantial H-shape as shown at the upper end of the part in FIG. 7, in that it has two spaced parallel planar side elements 42 and 44 which extend around the arcs of the circles, and a further element or bar 46 forming the bar of the H. The bar 46 and the side elements 42 and 44 define, on each side of the bar 46, a radially inner planar guide channel 48 and a coplanar radially outer guide channel 50. The side element 42 is integrally molded with four spacing projections 52 which are spaced-apart along its length as shown in FIG. 6, and also has three screw-receiving holes 54 through which screws (not shown) extend to secure the hinge part 36 to a side wall 56 of the upper front cover 14. This is shown in FIG. 9 in which, as also can be seen, the spacing projections 52 hold the side element 42 spaced from the side wall 56.

With reference to FIG. 8, the other hinge part 38 of each pair 34 is molded with an interrupted radially outer guide rib 58 and an interrupted radially inner guide rib 60 which are coplanar and are formed upon arcs of circles so as to be slidably receivable within the radially inner and outer guide channels 48 and 50 of the part 36. The ribs 58 and 60 are spaced-apart to form a gap 61 for receiving the bar 46 of hinge part 36. Thus the two parts 36 and 38 are relatively slidable one upon the other around the center 40 shown in FIG. 6. FIG. 9 shows one pair of hinge parts 34 in assembled condition in which the ribs 58 and 60 are assembled into the guide channels. The hinge part 38 is also formed with upper and lower arcuate flanges 62 and 64 which lie radially inwardly and outwardly at each side of the hinge part (see FIGS. 8 and 9). An arcuate strengthening flange 66, of compound section, extends outwardly from the flange 64 and, in two positions, the flanges 62 and 64 are held in fixed positions apart by two radially extending integral struts 68. The arcuate structure of the hinge part 38 carries at one end a mounting structure 70 and the flange 62 is supported throughout its length by a planar web 72 extending upwardly from the mounting structure 70.

Figure 3:
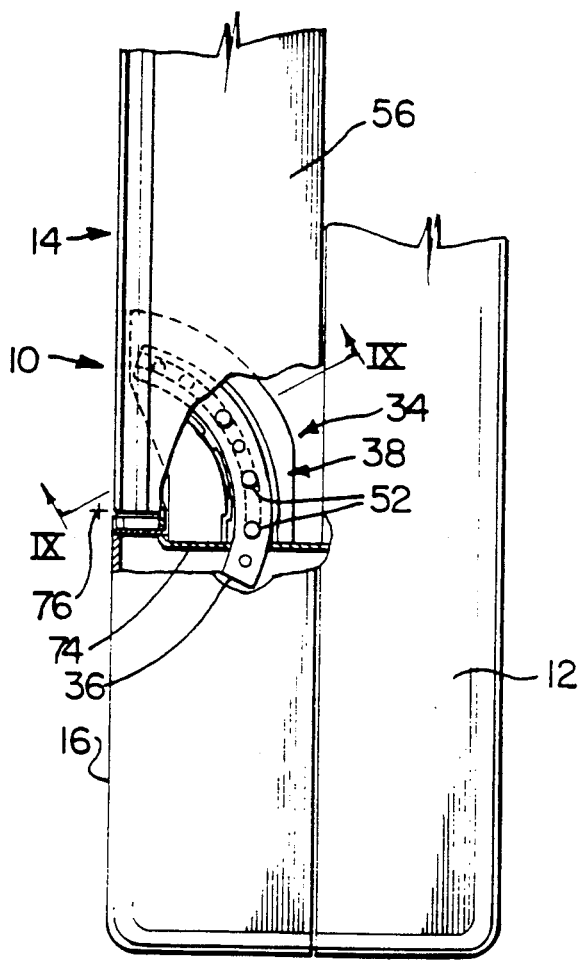
FIG. 3 is a side elevational view, partly in cross-section, of the closed telephone base in the direction of arrow III in FIG. 1 and to a larger scale.
Figure 4:
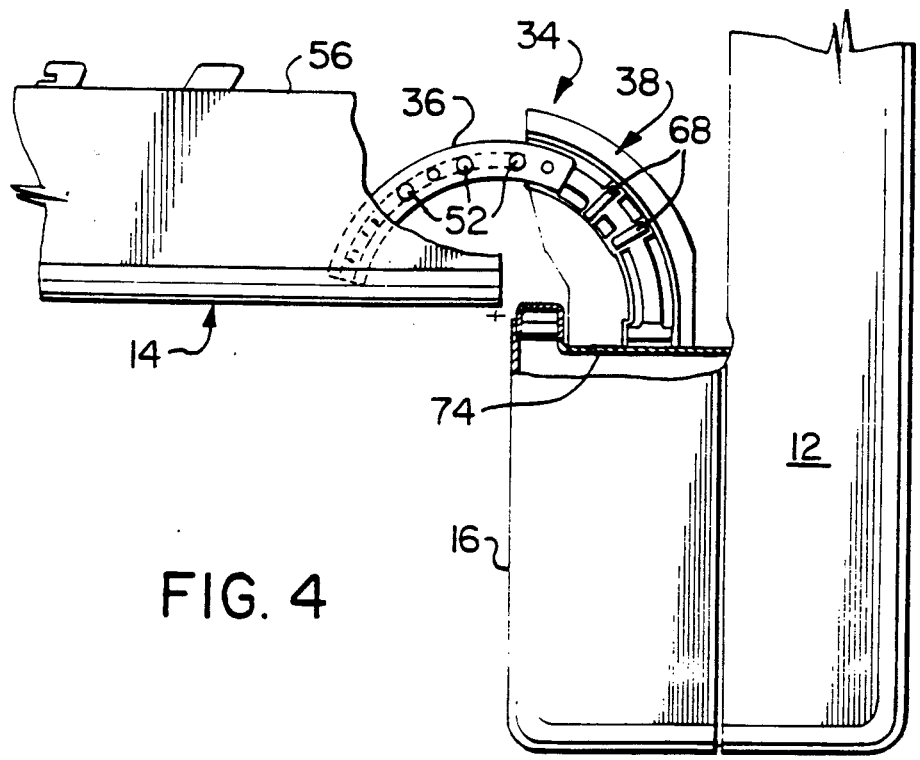
FIG. 4 is a view similar to FIG. 3 and showing the terminal base in an open condition.

As may be seen from FIG. 2, and more particularly from FIGS. 3 and 4, each of the hinge parts 38 is secured by screws (not shown) passing through the mounting structure 70 to a horizontal platform 74 of the wall mount 12, the platform 74 extending forwardly so as to lie beneath the upper front cover 14 in the closed condition. Platform 74 in effect separates the electronic operational equipment behind the upper front cover from the coin storage and coin return housed behind the lower front cover 16.

The two pairs 34 of hinge parts are mounted upon the respective upper front cover 14 and wall mount 12 so that they are centered about a hinge axis 76 which lies forwardly of the front closure member when in its closed condition. In fact, as shown by FIGS. 3 and 4, the hinge axis 76 coincides with the center of radius 40 of the two hinge parts of each pair and as shown in FIG. 6.

As may be seen, therefore, with the two hinge parts of each pair mounted, one upon the corresponding side wall 56 of the upper front cover and the other upon the platform 74, then the horizontal hinge axis lies slightly forwardly of the whole of the terminal base structure in the closed position and approximately horizontally in-line with the lower edge of the upper front cover. In this closed position, the whole of each of the hinge parts 36 is received within the structure of its corresponding hinge part 38, as shown in FIG. 3, except for a lower end of the hinge part 36 which projects through a hole provided in the platform to a position beneath. To move the upper front cover to its open position as shown in FIGS. 2 and 4, it is merely pivoted downwardly about the hinge axis 76 and the hinge parts 36 slide outward from the hinge parts 38 to the position shown in FIG. 4.

The structure also comprises a strut 78 (FIG. 2) which is attached to a rear face 80 of the wall mount 12, this strut also being attached to the base wall 32 of the upper front cover 14. This strut is constructed so as to provide a counterbalancing effect and support the weight of the upper front cover in its lower or open position whereby binding of the hinge parts together is prevented and closing of the structure may be effected simply by lifting upwardly with a hand under the upper front cover. The structure of the hinge parts is such that upon disconnection of the strut 78 in the open position, the hinge parts 36 may be removed completely from the hinge parts 38 whereby the upper front cover 14 is completely removed after electrical disconnection so that any maintenance or repair may be completed at a more convenient location. Upper front cover removal is indicated by FIG. 5.

As may be seen from the embodiment as so far described, the upper front cover is hingedly arranged upon the wall mount about a hinge position which lies forwardly of the total structure and the design is such that no hinge parts or mounting parts for the upper front cover are accessible from the exterior of the terminal base when this is in the closed position. This is because the hinge arrangement is not of a conventional hinge structure but is formed from arcuate relatively slidably movable parts none of which extend as far as or around the hinge axis itself. In addition, the lower horizontal hinge axis position of the upper front cover assists in easing the task of providing maintenance or repair upon the electronic equipment carried by the upper front cover. Also the structure of each of the hinge parts is particularly rigid due to its design, and this rigidity is increased by the mounting of the hinge parts upon the side wall of the upper front cover and upon the platform 74.

Further points in the structure of the embodiment are worthy of attention. As may be noted, the upper front cover is of rectangular shape with its longitudinal axis extending away from the horizontal hinge position and vertically when in the closed condition. There is a possibility, because of this geometrical arrangement around the hinge position that a slight misalignment may take place between the side walls of the upper front cover and side walls 82 of the wall mount (FIG. 2) during the closing procedure. This misalignment is corrected by structural features which will now be described.

Figure 10:
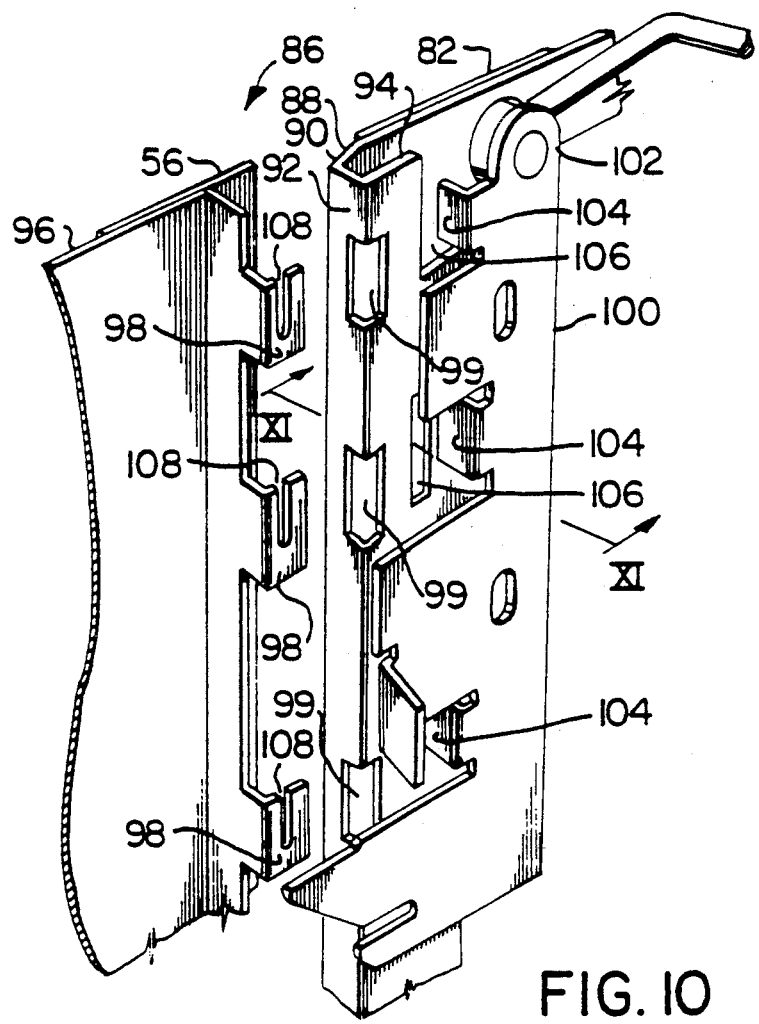
FIG. 10 is an isometric view of part of a locking mechanism of the terminal base showing the parts in exploded view.

As may be seen from FIG. 10, the terminal base 10 comprises a locking mechanism 86. This locking mechanism, at each side of the structure, comprises a box structure 88 secured to a side wall 82 of the wall mount 12. Each box structure has a vertical wall 90 extending forwardly of the side wall 82, a forward facing wall 92 extending from the wall 90 and a rearwardly directed wall 94 extending from the wall 92. On each side of the structure, the locking mechanism also comprises a plate 96 which extends along and is secured to a corresponding side wall 56 with the side wall 56 extending slightly outwardly beyond the plate 96 as shown in FIG. 10. Plate 96 is formed at spaced positions with shaped latch keepers 98 which, when the upper front cover is moved towards its closed position, are received through slots 99 provided around the junctions of the walls 92 and 94 of the corresponding box structure 88. A latch plate 100 extends vertically alongside the rearwardly extending wall 94 of the box structure and is hingedly connected at a top end 102 around an eccentric so that rotation of an eccentric pin formed by a key mechanism (not shown) will cause upward or downward movement of the latch plate 100. The latch plate 100 is formed with spaced latches 104 which project through further slots 106 in the wall 94. Downward movement of the latch plate 100 moves the latches 104 downwardly along the slots 106 and into a locking position in which the latches 104 enter upwardly opening slots 108 in the latch keepers 98 to retain the upper front cover in the closed position.

Figure 11:
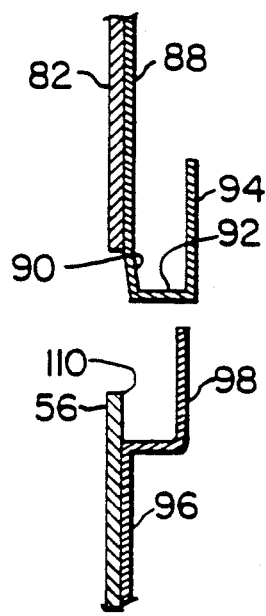
FIG. 11 is a cross-sectional view along line XI—XI in FIG. 10 showing the closure members and parts of the locking mechanism during closing of the terminal base.
Figure 12:
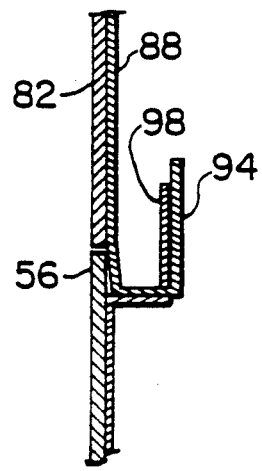
FIG. 12 is a view similar to FIG. 11 showing the terminal base in a closed condition.

Of particular interest is the shape of the wall 90 of each of the box structures. As may be seen particularly from FIGS. 11 and 12, each wall 90 is inclined inwardly to the forward direction of the wall mount 12 so that during closing of the terminal base, an inside edge 110 of the corresponding wall 56 of the upper front cover will engage the surface 90 in a case of misalignment of the upper front cover 14 in one direction. In a case of misalignment in the opposite direction the other wall 90 on the opposite side of the wall mount 12 becomes effective. As closing of the terminal base continues the edge 110 rides along the inclined wall 90 which therefore provides a guide surface for correcting misalignment and moving the side wall 56 into exact alignment with the side wall 82 of the wall mount 12. This alignment procedure is progressive upwardly of the wall 90 during the closing procedure so that correct alignment must take place. An angle of approximately 5° to the forward direction suffices for the inclined wall 90. FIG. 12 shows the alignment procedure completed after closing of the terminal base.

To assist in providing alignment during closing, the upper front cover 14 has, at each side, two spaced alignment tabs 112 extending from the plates 96 beyond the sides 56 (see FIGS. 2, 4 and 5). These tabs are inclined relative to the direction of closing of the upper front cover and enter further slots 114 provided around the junction of walls 92 and 94. In a case of misalignment of the front cover, the tabs 112 enter the slots 114 during closing and as the tabs are inclined, they engage one side or the other of the corresponding slots 114 and help to urge the upper front cover into a position of alignment.

It follows therefore that not only does the structure according to the embodiment provide an arrangement for allowing for downward pivoting movement of a front cover of a telephone base while minimizing possible damage from vandal activity, but also the structure having a major vertical axis is designed so as to ensure correct alignment upon closure thereby closing any possible access positions for breaking open the terminal base.

What is claimed is:

1. A telephone terminal base having a rear closure member for mounting on a vertical support, the rear closure member comprising an internal horizontal platform, and a front closure member which is mounted upon the rear closure member about a horizontal hinge axis by a hinge structure means which comprises two pairs of hinge parts, the pairs disposed in spaced positions in a direction parallel to the hinge axis and each pair comprising a hinge part secured to the horizontal platform of the rear closure member and a hinge part upon the front closure member with the hinge parts of each pair slideably movable one upon the other along an arc of a circle centered on the horizontal hinge axis to angularly move the front closure member between a closed position upon the rear closure member with the front closure member disposed above the platform and in which the hinge axis is disposed forwardly of the front closure member, and an open position towards which the front closure member is hingedly moved forwardly from the rear closure member, the hinge parts spaced from the horizontal hinge axis to lie entirely within the telephone terminal base with the front closure member in the closed position; and wherein provision for coin storage and coin return is provided below the platform and the front closure member carriers a set of telephone dialing buttons.

2. A telephone terminal base according to claim 1 wherein the front closure member is hingedly moved forward from the closed position in a forward and downward direction.

3. A telephone terminal base according to claim 1 wherein in each pair of hinge parts, the hinge part secured to the front closure member is secured to side walls of the front closure member.

4. A telephone terminal base according to claim 1 wherein in each pair, each hinge part is an integrally molded structure.

5. A telephone terminal base according to claim 4 wherein each hinge part is molded from a glass-filled resin material.

6. A telephone terminal base according to claim 1 wherein in each pair of hinge parts, the hinge part secured to the front closure member extends around the arc of a circle centered upon the horizontal hinge axis and has a radially inner and a radially outer planar guide channel and the other hinge part of the pair has a radially inner and a radially outer guide rib locatable each within a corresponding channel with the hinge parts relatively slideably movable by relative movement of the ribs and channels during movement of the front closure member into and out of the closed position.

7. A telephone terminal base according to claim 6 wherein the guide ribs are completely removable from the guide channels to allow for complete removal of the front closure member from the rear closure member.

8. A telephone terminal base according to claim 6 wherein in each pair of hinge parts, the hinge part secured to the front closure member is secured to a side wall of the front closure member and has two spaced parallel planar side elements extending around arcs of circles centered upon the horizontal hinge axis, the side elements defining between them the radially inner and outer guide channels which are spaced by a further element extending between the side elements.

9. A telephone terminal base having a rear closure member for mounting upon a vertical support and a front closure member which is mounted upon the rear closure member about a horizontal hinge axis by a hinge structure means which comprises hinge parts secured to front and rear closure members, the hinge parts co-acting so as to slideably move one up on the other along an arc of a circle centered on the horizontal hinge axis to angularly move the front closure member between a closed position upon the rear closure member and an open position towards which the front closure member is hingedly moved forwardly from the closed position in a forward and downward direction, the hinge parts spaced from the horizontal hinge axis to lie entirely within the telephone terminal base with the front closure member in the closed position; and wherein one of the closure members has a guide surface at each side extending away from the horizontal hinge access, one of the guide surfaces being engageable by a wall of the other closure member as the front closure member is moved towards the closed position in a case of misalignment of the members, each guide surface being inclined relative to the planes of movement of the front closure member so as to progressively align the closure members during the closing action.

10. A telephone terminal base according to claim 9 wherein the rear closure member is provided with the guide surfaces which extend upwardly at each side of the rear closure member and are inclined to the forward direction for engagement with a wall of the front closure member during a case of misalignment.

11. A telephone terminal base according to claim 10 wherein each guide surface is provided as a surface of a box structure forming part of a locking mechanism for the front closure member, each box structure extending vertically and having vertically spaced slots for receiving latch plates attached to the front closure member in the closed position, the latch plates when received through the slots being engageable by latches to retain the front closure member in the closed position.

* * * * *